Oct. 26, 1965     H. L. GIANATASIO     3,214,322
ADHESIVE COATED PAPERBOARD PRODUCT
Filed Feb. 4, 1963
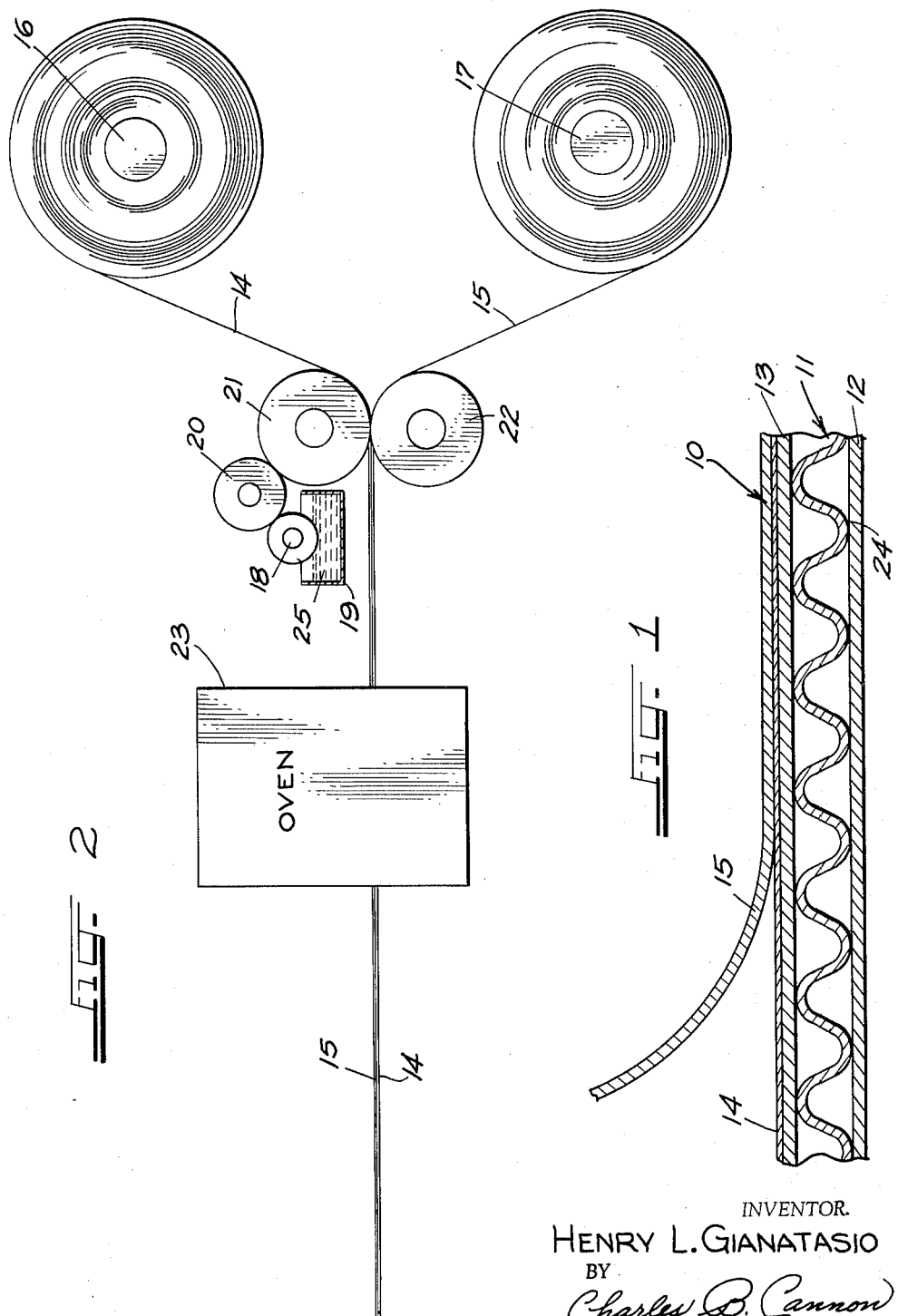
INVENTOR.
HENRY L. GIANATASIO
BY
Charles B. Cannon
ATT'YS.

United States Patent Office 3,214,322
Patented Oct. 26, 1965

3,214,322
ADHESIVE COATED PAPERBOARD PRODUCT
Henry L. Gianatasio, Oak Park, Ill., assignor to Pres-On Abrasives, Inc., Addison, Ill., a corporation of Illinois
Filed Feb. 4, 1963, Ser. No. 255,756
1 Claim. (Cl. 161—133)

This invention relates to an adhesive coated paperboard product and to a method of making the same.

It is common practice in the packaging of various articles of merchandise to use adhesive coated paperboard stock coated with a pressure-sensitive adhesive to hold articles of merchandise in position in a carton or package during the time the articles are in the carton or package to prevent them from being shifted and damaged during shipment and handling.

One of the problems involved in the use of such pressure-sensitive coated adhesive paperboard stock is the fact that the pressure-sensitive coating on the paperboard stock frequently possesses greater cohesive strength than the adhesive tack and bond between the pressure-sensitive adhesive coating and the paperboard stock with the result that the pressure-sensitive coating strongly adheres to the article of merchandise to which it is fastened with the result that when an attempt is made to remove the article from its attachment to the pressure-sensitve adhesive coated paperboard stock the latter delaminates from the pressure-sensitive adhesive coating. This results in part of the pressure-sensitive adhesive coating adhering to the article of merchandise and part of it adhering to the article of merchandise and part of it adhering to the paperboard stock.

An object of the present invention is to provide a new and improved pressure-sensitive adhesive coated paperboard stock and a new and improved method of making the same to the end that in the use of the new pressure-sensitive adhesive coated paperboard stock the paperboard base will not delaminate or become separated from the pressure-sensitive adhesive coating when an article of merchandise adhered thereto is removed from engagement with the pressure-sensitive adhesive coating after use.

Another object of the present invention is to provide a new and improved pressure-sensitive adhesive coated paperboard materials presently used in connection with the packaging of merchandise, and for similar purposes.

An additional object of the invention is to provide a new and improved pressure-sensitive coated paperboard embodying as a component part thereof a pressure-sensitive adhesive impregnated filter paper which provides additional strength to the paperboard stock and additional cohesive strength to the pressure-sensitive adhesive component and prevents the latter from delaminating from the paperboard stock while, at the same time, improving the adhesive characteristics of the pressure-sensitive adhesive coating with which the filter paper component of the new paperboard material is impregnated.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying these principles. Other embodiments of the invention embodying the same or equivalent principles may be used and structural changes may be made therein as desired by those skilled in the art without departing from the purview of the present invention.

In the drawing:

FIG. 1 is an enlarged fragmentary view of a section of paperboard material embodying the present invention; and FIG. 2 is a diagrammatic view illustrating a typical method for making the new paperboard product.

A preferred embodiment of the new paperboard product is illustrated in FIG. 1 of the drawing, wherein it is generally indicated at 10, and comprises a base component 11 of paperboard stock, or so-called cardboard stock, consisting of a pair of spaced paperboard layers 12 and 13 and an intermediate layer 24 of corrugated material adhesively joined to the paperboard layers 12 and 13, by means of any suitable adhesive, as is well understood in the art. The paperboard base stock may be of any suitable quality and for this purpose I have found that double faced corrugated paperboard of 200 lbs. test strength, or paperbox board of 30 points (thickness) to be very satisfactory.

It has been customary practice heretofore in the art to coat paperboard stock, such as the paperboard material 11, illustrated in FIG. 1, directly on one face thereof with a pressure-sensitive adhesive coating and to use such pressure-sensitive adhesive coated paperboard stock for the purpose of holding articles of merchandise adhesively joined to the pressure-sensitive adhesive coating when and during the time they are packaged for shipment. However, it has been found in the use of the prior art types of pressure-sensitive adhesive coated paperboard stocks that delamination occurs between the paperboard base stock and the pressure-sensitive adhesive coating thereon, when an article of merchandise is removed from the pressure-sensitive adhesive coated surface of the material after use. The result of this is that when it is desired to detach the article of merchandise from the pressure-sensitive adhesive coated surface the paperboard stock will become delaminated from the pressure-sensitive adhesive coating which will remain, in part, upon the article of merchandise, and in part attached to the paperboard base stock.

In the practice of the present invention I have overcome the foregoing and other difficulties experienced in the use of the prior art pressure-sensitive adhesive coated paperboard materials by employing as a component of the new paperboard product a layer 14 of filter paper, of the type commonly employed in chemical laboratories, for coffee-making units, and in like places, impregnated with a pressure-sensitive adhesive coating, and laminated directly to at least one surface, as 13, of the paperboard base stock 11, and then placing thereover a release-coated sheet 15 which may be removed from the pressure-sensitive adhesive impregnated filter paper component 14 prior to the use of the paperboard unit 11–12–13–14–24 thus formed.

A typical method of making the new pressure-sensitive adhesive coated product is illustrated in FIG. 1 of the drawing, and in accordance therewith a web of filter paper 12 is wound upon a feed roll 16 and a web of the release-coated paper 15 is wound upon a feed roll 17 and the webs 14 and 15 are passed between coating rolls 21 and 22 where the filter paper web 14 is impregnated with a pressure-sensitive adhesive coating 25. The pressure-sensitive adhesive coating 25 may be transferred from a bath 19 thereof, by way of a pickup roll 18 and a transfer roll 20, to a coating roll 21. Thus, as the web 14 of filter paper passes under the coating roll 21 and between the latter and the roll 22, it is impregnated wtih the pressure-sensitive adhesive 25, whereupon the thus impregnated filter paper web 14 and the release-coated paper web 15 may be passed through a drying oven 23 to remove the volatile solvents from the pressure-sensitive adhesive coating 25 and thus dry the two webs 14 and 15 and thereby laminate them together.

After the filter paper 14 and the release-coated paper web 15 are thus laminated together and cured in the drying oven 23 the impregnated filter paper 14 and its attached release-coated paper 15 may be laminated to the paperboard base unit 11 by laminating the pressure-sensitive adhesive coated filter paper 14 directly to the sheet 13 of the paperboard stock unit 11 to complete the unit, as shown in FIG. 1.

In the use of the new paperboard product, it has been found that the pressure-sensitive adhesive coated impregnated filter paper 14 greatly improves the tensile strength and other characteristic of the paperboard product 11 while, at the same time, it prevents delamination of the pressure-sensitive adhesive from the paperboard stock when an article of merchandise is removed from the pressure-sensitive adhesive coating by reason of the fact that the cohesive strength of the pressure-sensitive adhesive impregnated filter paper 14 is substantially greater than the adhesive tack or bond between the pressure-sensitive adhesive therein and the article of merchandise, with the result that delamination of the pressure-sensitive adhesive from the paperboard base unit 11 is prevented when it is desired to remove the article of merchandise from the paperboard base unit 11.

The pressure-sensitive adhesive coating used for impregnating the filter paper web 14 may be any selected one of numerous pressure-sensitive adhesive coatings available on the market, and for this purpose I have found the following pressure-sensitive adhesive coating to be very satisfactory, namely, a pressure-sensitive adhesive product of Rubber and Asbestos Corporation, Bloomingfield, New Jersey, identified as P–551. The filter paper 14 may be of any suitable grade and quality and for this purpose I have found the following filter paper to be astisfactory, namely, a filter paper produced by Filpaco Industries, Inc., Chicago, Illinois, and known as Filpaco, and which is particularly adapted for use in coffee-making apparatus and the like. Similarly, the release-coated paper 15 may be of any suitable grade and quality and for this purpose I have found the following release-coated paper to be satisfactory, namely, a silicone resin release-coated paper made by Crocker Burbank Company, Fitchburg, Massachusetts, and known by the trademark Stick-Not.

It will thus be seen from the foregoing description, considered in conjunction with the accompanying drawing, that the present invention provides a new and improved pressure-sensitive adhesive coated paperboard product and a new and improved method of making the same, and that the invention thus has the desirable advantages and characteristics, and accomplishes the intended objects including those hereinbefore pointed out and others which are inherent in the invention.

I claim:

As a new article of manufacture, a packaging unit for use in holding articles of merchandise in packaged condition during shipment and handling comprising a double faced corrugated paperboard base having adhesively attached to at least one surface thereof a layer of filter paper impregnated throughout with a pressure-sensitive adhesive coating material, and a sheet of silicon coated release paper removably attached to the pressure-sensitive adhesive coated surface of the said layer of filter paper whereby in the use of the said packaging unit when the coated release paper is removed and an article is placed upon the exposed adhesive surface, the adhesive holds the said article in position during transportation and handling.

References Cited by the Examiner

UNITED STATES PATENTS

| | | | |
|---|---|---|---|
| 1,561,471 | 11/25 | Kress | 161—137 |
| 2,206,899 | 7/40 | Kellgren | 161—406 |
| 2,239,107 | 4/41 | Lefebure | 161—406 |
| 2,444,830 | 7/48 | Kellgren et al. | 161—167 |
| 2,576,278 | 11/51 | Bode | 161—133 |
| 2,599,359 | 6/52 | Banks et al. | 161—406 |
| 2,744,624 | 5/56 | Hoogstoel et al. | 156—210 |
| 2,944,716 | 7/60 | Hoogstoel | 117—122 |
| 3,063,498 | 11/62 | Ford | 161—137 |
| 3,063,885 | 11/62 | Kieffer | 161—167 |

EARL M. BERGERT, *Primary Examiner.*

ALEXANDER WYMAN, *Examiner.*